United States Patent [19]
Hidaka

[11] Patent Number: 5,572,318
[45] Date of Patent: Nov. 5, 1996

[54] LEAD PIPE CONFIGURATION FOR UNDERGROUND PIPE LAYING

[75] Inventor: Norizumi Hidaka, Tokyo, Japan

[73] Assignee: Houshou Co., Ltd., Tokyo, Japan

[21] Appl. No.: 419,149

[22] Filed: Apr. 10, 1995

[30] Foreign Application Priority Data

Nov. 29, 1994 [JP] Japan ................................. 6-294624

[51] Int. Cl.⁶ ............................................. G01B 11/26
[52] U.S. Cl. ........................ 356/153; 33/286; 405/184; 356/400
[58] Field of Search ..................... 356/153, 399, 356/400; 33/286, 293; 405/174, 175, 184

[56] References Cited

U.S. PATENT DOCUMENTS

| | | | |
|---|---|---|---|
| 4,020,641 | 5/1977 | Takada | 405/184 |
| 5,189,554 | 2/1993 | Vanasse et al. | 359/601 |

FOREIGN PATENT DOCUMENTS 3513750  10/1986  Germany.

*Primary Examiner*—F. L. Evans
*Attorney, Agent, or Firm*—Morrison Law Firm

[57] ABSTRACT

A lead pipe configuration for use in an underground piping device wherein a succession of lead pipes are propelled in a forward direction to guide pipeline lay down are provided with ring-shaped light shields in at least some of the lead pipes so that such light shield can block at least some of the light projected rearwardly from a direction correction head at a foremost tip of the lead pipe configuration that would interfere with axially directed incident light that is to be detected by a transit at the rear of the configuration, this detection being used to determine if lead pipe configuration direction error is present and if so that it be corrected. The lead pipes also can have a high light absorption coating such as a resin on the inner lead pipe surfaces to absorb reflected light that otherwise could interfere with proper light detection.

12 Claims, 9 Drawing Sheets

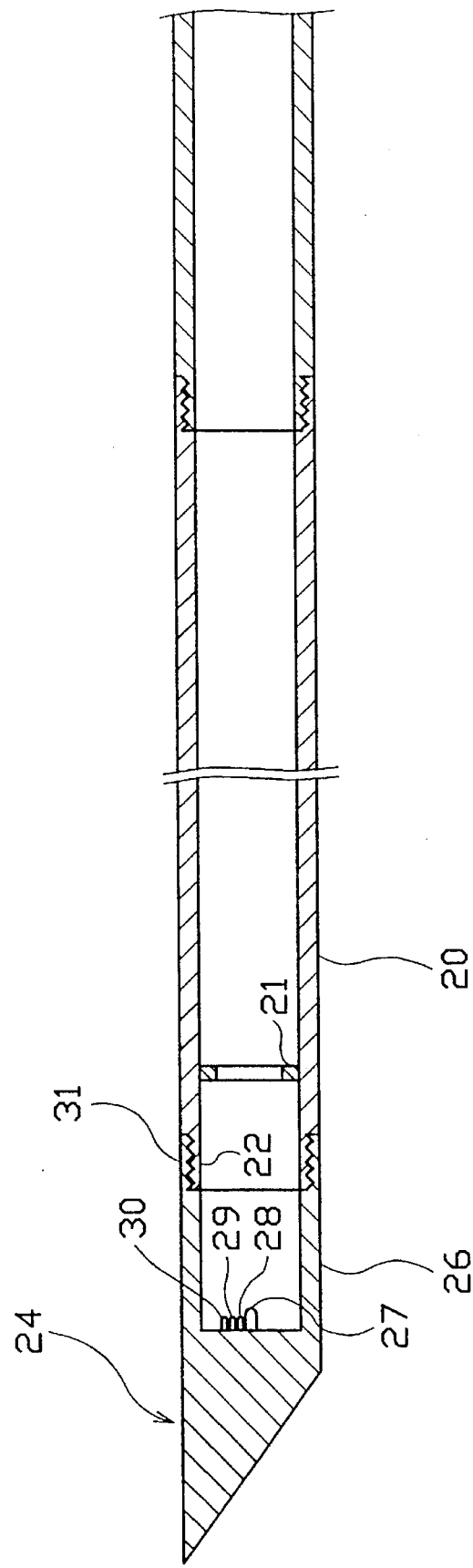

LEAD PIPE CONFIGURATION FOR UNDERGROUND PIPE LAYING

BACKGROUND OF THE INVENTION

The present invention relates to lead pipes used for guiding proper directional advance of an underground piping run such as for a fresh water or a sewer line and, more particularly, to a lead pipe arrangement wherein light blocking and light absorbing means are provided within at least some of the lead pipes to prevent unwanted light interference with a light detecting transit located at the rear of the lead pipe arrangement and which detected light is used for determining if lead pipe run and hence, piping run lay down has correct direction.

In past propulsion-type piping devices, a propulsion machine is used to rotate and propel a lead pipe configuration, which has a direction correcting head. As propulsion proceeds, lead pipes are added on from a rear of the configuration in endwise succession form as needed and until the pipe lay down destination is reached. These lead pipes are used as guides for propelling an excavation screw and piping being laid down.

If there is an error in the direction of the lead pipes, the direction correcting head is used to correct the direction. A light source is located at the rear of the direction correcting head in order to determine whether the direction of propulsion matches the planned direction. The light from this light source passes through the hollow center of the lead pipes and is detected by a transit, and the lead pipe advance direction is adjusted based on this.

In the underground piping device described above, the light source arranged at the rear of the direction correcting head passes through the lead pipe hollow center, thus allowing some of the light reflect against the inside surface of the lead pipe. This results in situations where the light from the light source could not be detected accurately by the transit. The lead pipes are generally made of steel for strength reasons, and this causes irregular reflections. When pipes are put in storage after use, oil is applied as a rust-prevention measure, and this also leads to irregular reflections. These irregular reflections can affect the accuracy of the light detection and correction procedure greatly.

OBJECTS AND SUMMARY OF THE INVENTION

Accordingly, it is an object of the invention to provide a lead pipe configuration for use in an underground piping device which overcomes the drawbacks of the prior art.

It is a further object of the invention to provide a pipe configuration for use in an underground piping device which allows more easy and accurate detection of light from a direction correction head at a foremost tip of the lead pipe configuration by use of ring-shaped light shields and light absorption coatings in the lead pipes to block and/or absorb reflected light that could interfere with the axially directed incident light present in the lead pipes and which is intended to be detected.

Briefly stated, there is provided a lead pipe configuration for use in an underground piping device wherein a succession of lead pipes are propelled in a forward direction to guide pipeline lay down. Ring-shaped light shields are provided in at least some of the lead pipes so that such light shields can block at least some of the light projected rearwardly from a direction correction head at a foremost tip of the lead pipe configuration that would interfere with axially directed incident light that is to be detected by a transit at the rear of the configuration. This detection of light is used to determine if lead pipe configuration direction error is present and if so, it be corrected. The lead pipes also can have a high light absorption coating such as a resin on inner surfaces of the lead pipes to absorb reflected light that otherwise could interfere with proper light detection.

In accordance with these and other objects of the invention, there is provided a lead pipe configuration for use in an underground piping device of a type which lays down an underground pipeline, wherein the piping device includes propelling means for propelling the lead pipe configuration in a forward direction to guide the pipeline lay down. The lead pipe configuration comprises plurality of hollow lead pipes connected in endwise succession of one lead pipe with another, a direction correcting head being carried at a fore end of a frontmost lead pipe in the succession. A light source is carried in said direction correcting head for projecting light rearwardly in the lead pipe succession toward a light detection means so that a detected light can be used to determine if any error in lead pipe direction from the said predetermined direction exists requiring that lead pipe direction adjustment be made. A ring-shaped light shield is carried in at least one of the lead pipes in said succession and disposed crosswise to a lead pipe major axis so as to block passage of at least some of any rearwardly non axially directed incident light as well as light reflecting off lead pipe inner surfaces upstream of the light shield.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3b is a cross-section taken along the line A—A in FIG. 3a;

FIG. 4 is a vertical sectional view showing use of the FIG. 3a lead pipe and FIG. 3c direction correcting head in a pipeline laying operation;

DETAILED DESCRIPTION OF THE PREFERRED EMBODIMENT

Figure 1:
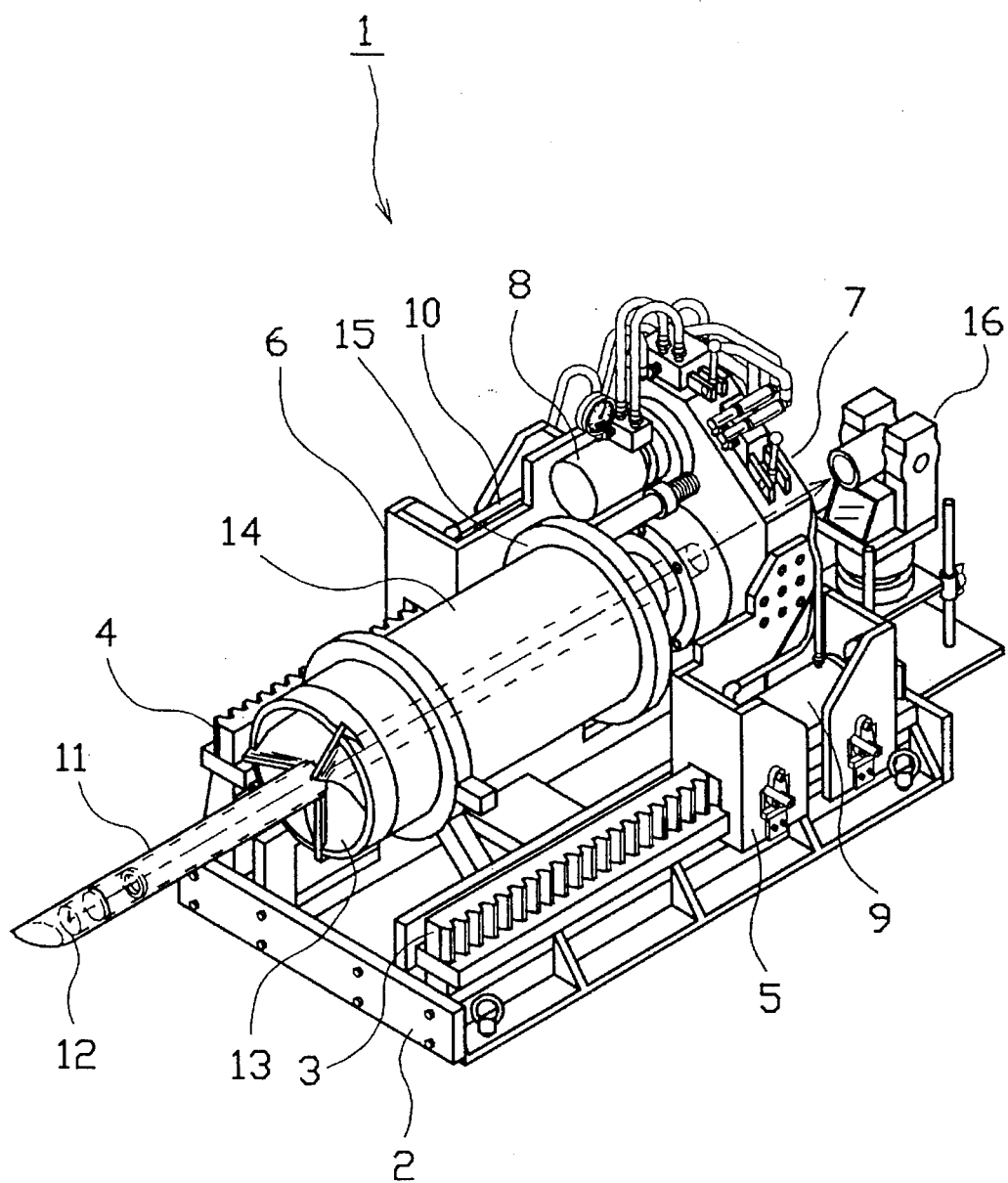
FIG. 1 is a perspective view of an underground piping device with which a lead pipe made in accordance with the invention is used.

The present invention relates to a lead pipe configuration for a propulsion-type underground piping device used for lay down of, e.g., fresh water and sewer line pipe runs. Such a device and the method for laying underground pipes using this device will first be described With reference to FIGS. 1 and 2. As shown in FIG. 1, an underground piping device 1 comprises: a base 2; rails 3, 4 arranged parallel to and above base 2; slide sections 5, 6 moving back and forth along rails 3, 4; and a propulsion machine 7 supported by slide sections 5, 6.

An oil hydraulic motor 8 is arranged on propulsion machine 7 and drives a drive shaft positioned roughly at the center of propulsion machine 7. Oil hydraulic cylinders 9, 10 are arranged internally within slide sections 5, 6, and can move back and forth along rails 3, 4 along with propulsion machine 7.

The rear end of a lead pipe 11 is connected to the drive shaft of propulsion machine 7. The rotation force of the drive shaft is transferred to lead pipe 11, and when propulsion machine 7 moves forward, the propulsion force is applied to lead pipe 11. The tip of lead pipe 11 is made so that it can be connected to a direction correcting head 12.

The rear of a lead pipe is made so that it can be connected to an excavating screw 13. The rear end of excavating screw in turn, 13 is made so that it can be connected to the drive shaft of propulsion machine 7. The drive force from the drive shaft is transferred to excavating screw 13, and when the propulsion machine moves forward, it propels excavating screw 13.

A pipe length 14 of which a pipe run or pipeline is to be laid down is made up of a plurality of such lengths, is supported around excavation screw 13, and the rear end of lay down pipe length 14 is supported by pipe pusher 15 arranged on propulsion machine 7. When propulsion machine 7 moves forward, lay down pipe is propelled forwardly. A transit 16 is arranged at the rear of propulsion machine 7. Both lead pipe 11 and the drive shaft of propulsion machine 7 are hollow, so that light from the light source on direction correcting head 12 passes through the hollow center and is detected by transit 16.

Figure 2A:
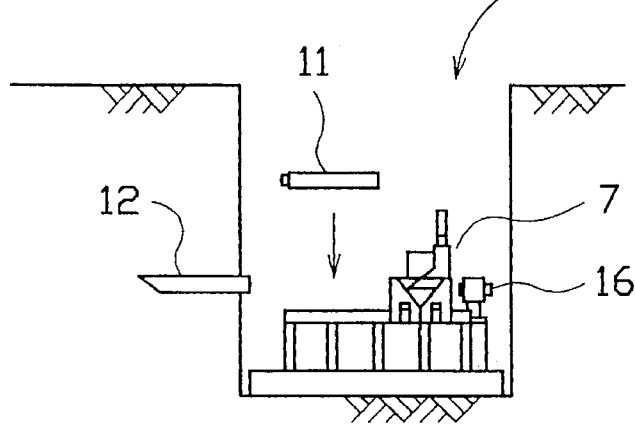
FIG. 2a is a diagrammatic depiction showing an initial setup of the underground piping device in a startup hole preliminary to starting the laying of an underground pipeline run and during which lead pipes are advanced for guiding of the following travel of an excavation screw and the components comprising the pipeline.
Figure 2B:
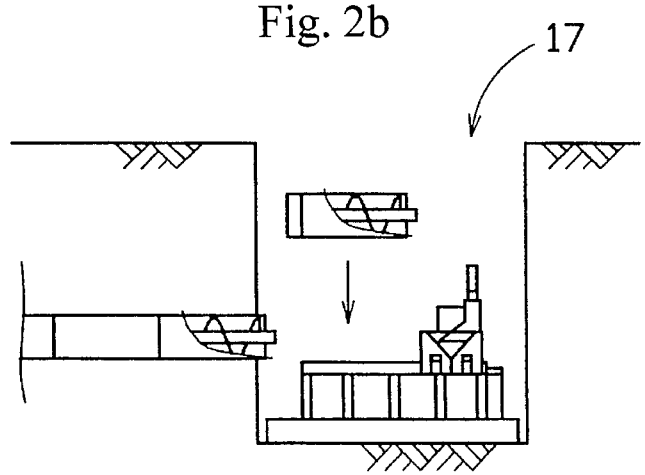
FIG. 2b is a depiction similar to shown in FIG. 2a but following laying of a part of the pipeline run.
Figure 2C:
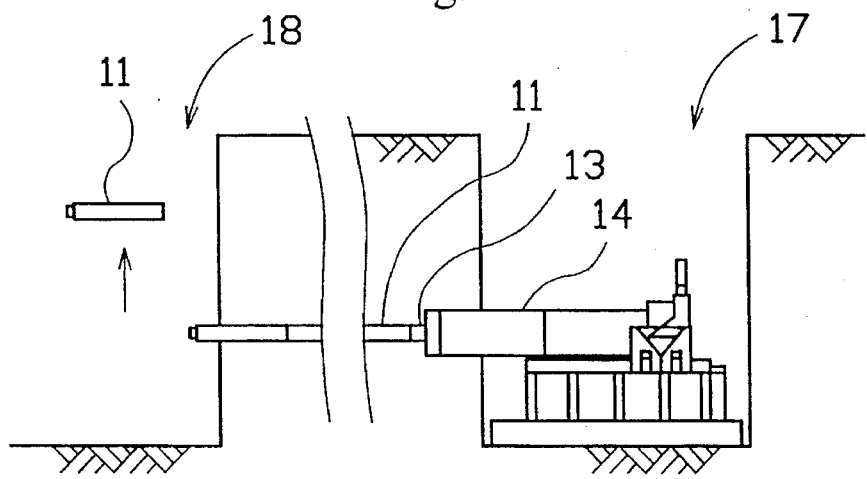
FIG. 2c is a depiction similar to FIG. 2b but following lead pipe breakthrough into a vertical destination hole at an end location of the pipeline run.

Referring to FIG. 2, the procedure for laying down pipes using underground piping device 1 will be described next. As seen in FIG. 2(a), underground piping device 1 is arranged within a vertical startup hole 17, and lead pipe 11 with direction correcting head 12 arranged at its tip is propelled forwardly through the underground wherein a pipeline run is to be laid down. This propulsion is performed with propulsion machine 7. Propulsion machine 7 moves back after a lead pipe 11 is propelled forwardly, and the next lead pipe 11 in a succession is connected to the propelled pipe and then propulsion is resumed.

A transit 16 is positioned at the rear of propulsion machine 7 (to the right in drawing FIG. 2). When direction correcting head 12 and lead pipe 11 are propelled, propulsion takes place while transit 16 detects the light from a light source within direction correcting head 12. It is understood that the direction head is always at the frontmost end of the lead pipe succession.

Referring again to FIG. 2(b), propulsion in halted when a vertical destination hole 18 is reached. Then, a screw 13 is connected to lead pipe 11. Pipe to be laid down 14 is arranged so that it surrounds screw 13, and screw 13 and pipe 14 are simultaneously propelled. After one screw 13 and pipe 14 are propelled, propulsion machine 7 moves back, the next screw 13 and pipe 14 are added on, and propulsion continues. Because lead pipe 11 serves as a guide, a direction correcting head is not necessary, so it is removed at vertical destination hole 18. As propulsion proceeds, lead pipes 11 are removed one after the other at vertical destination hole 18. Thus, pipes 14 are laid down between startup vertical hole 17 and vertical destination hole 18 by propelling screw 13 and pipe 14 between the two holes, and by drawing just screw 13 using propulsion machine 7 and removing it.

Figure 3A:
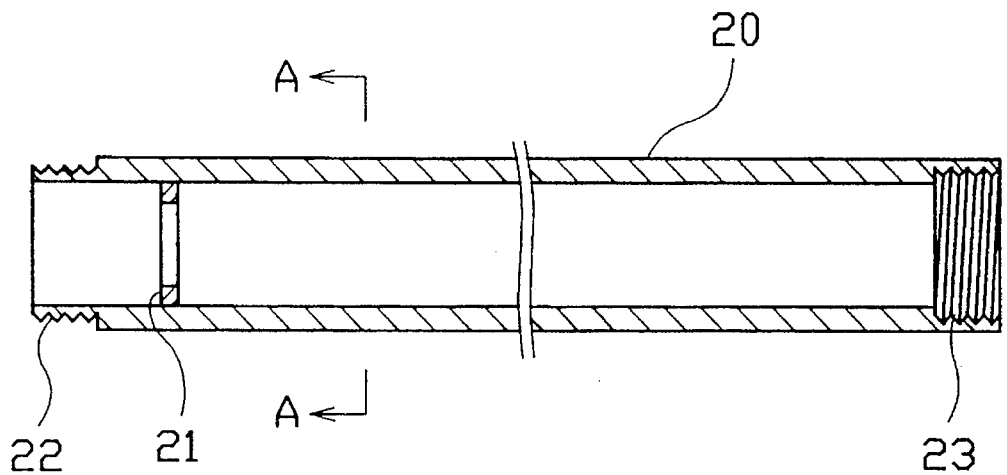
FIG. 3a is a vertical sectional view of a length of lead pipe used with the FIG. 1 device during laying of a pipeline run.
Figure 3B:
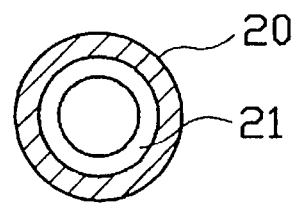

The following is a description of an embodiment of the lead pipe configuration of the present invention. Referring to FIGS. 3(a) and 3(b), this embodiment has a ring-shaped light shield 21 arranged within the hollow part of a lead pipe 20. Light shield 21 serves to shield light near the inside surface of lead pipe 20. A light absorber is applied to the entire inside surface of lead pipe 20, thus limiting the reflection of light. The high light absorption covering applied to the lead pipe inner surfaces could be a resin. It also could be a black paint. External threads 22 are formed on one end of lead pipe 20, and internal threads 23 are formed on the other end. This allows the lead pipe to connect with a direction correcting head as well as with other lead pipes.

Figure 3C:
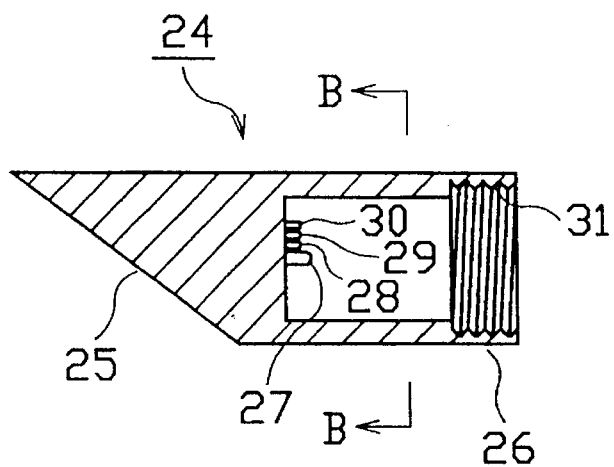
FIG. 3c is a vertical sectional view of a direction correcting head carried at the fore end of a first lead pipe in a succession of such used during laying of the pipeline run.
Figure 3D:
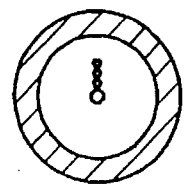
FIG. 3d is a section view taken along the line B—B in FIG. 3c.

Referring to FIGS. 3(c) and 3(d), direction correcting head 24 comprises a correcting portion 25, having a diagonally cut tip, and a hollow target portion 26. Correcting portion 25 makes direction correction possible by dispersing the resistance from dirt, which is applied from the propulsion direction. Target portion 26 indicates the central position using a large light-emitting diode 27 and indicates the peripheral areas with small light-emitting diodes 28, 29, 30. Internal threads 31 are formed inside the rear end (to the right in the drawing) of target portion 26 so that it can engage with external threads 22 of lead pipe 20.

Referring to FIG. 4, there is shown lead pipe 20 connected to direction connecting head 24. As seen from the drawing, light shield 21 is positioned away from light-emitting diodes 27, 28, 29, 30 of direction correcting head 24. Light shield 21 blocks at least part of the light shining diagonally relative to the inside surface of lead pipe 20. This decreases reflected light, and this limits irregular reflections within lead pipe 20. In this embodiment, a light absorber is applied on the inside surface of the lead pipe, and this weakens reflected light, and further limits irregular reflections within lead pipe 20.

Figure 5A:
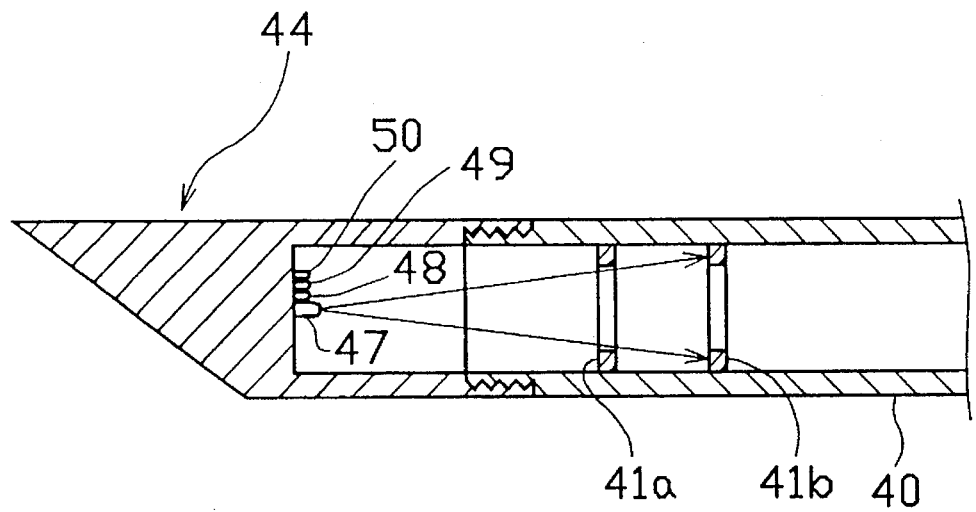
FIG. 5a is a fragmentary front end vertical sectional view of another embodiment of lead pipe with a direction correcting head fixed thereto.

FIG. 5(a) depicts another embodiment of the invention where plural ring-shaped light shields 41a, 41b are arranged within a lead pipe 40 similar to lead pipe 20 described above. Light that could not be blocked by light shield 41a, which is near direction correction head 44, is blocked by light shield 41*b*. This further reduces reflected light. As the arrow in the drawing shows, the angle of light that can be blocked by light shield 41*a* is different from the angle of light that can be blocked by light shield 41*b*. Thus, light other than that which is generated from light-emitting diodes 47, 48, 49, 50 can be blocked. The remaining light, i.e. the light which has not been blocked, is restricted to the light that passes through the central area of lead pipe 40.

Figure 5B:
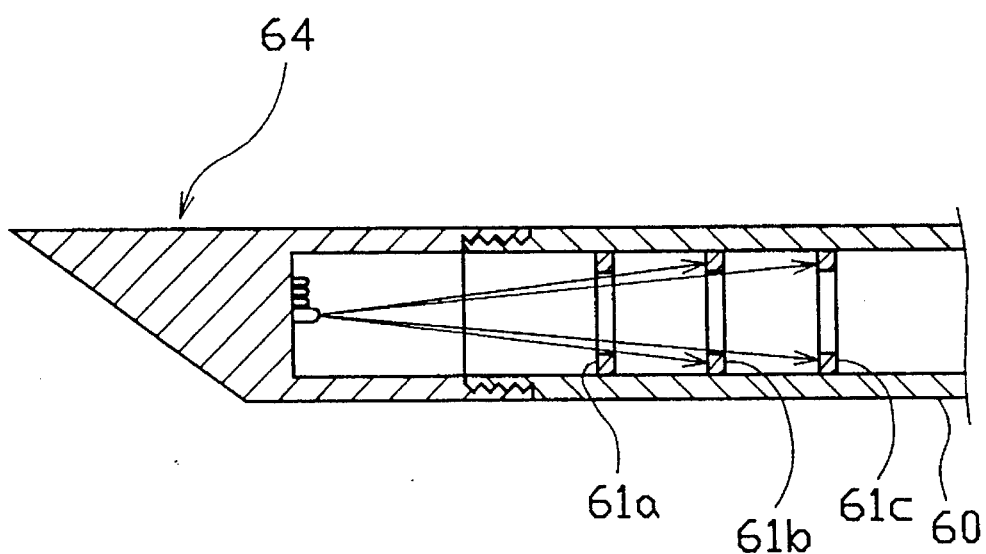
FIG. 5b is a view like FIG. 5a of still another embodiment of lead pipe.

FIG. 5(*b*) shows a further embodiment wherein plural light shields are arranged at the fore end of a lead pipe. Three light shields 61*a*, 61*b*, 61*c* are arranged at appropriate intervals within a lead pipe 60, similar to the pipe described above. This allows light that was not blocked by either near light shield 61 a or middle light shield 61*b* to be blocked by another light shield 61*c*. This blocks a very large amount of reflected light. Thus, the light that passes through is even further restricted to the central area of lead pipe 60. It goes without saying that adding more light shields would limit the reflected light within the lead pipe even more.

Figure 6:
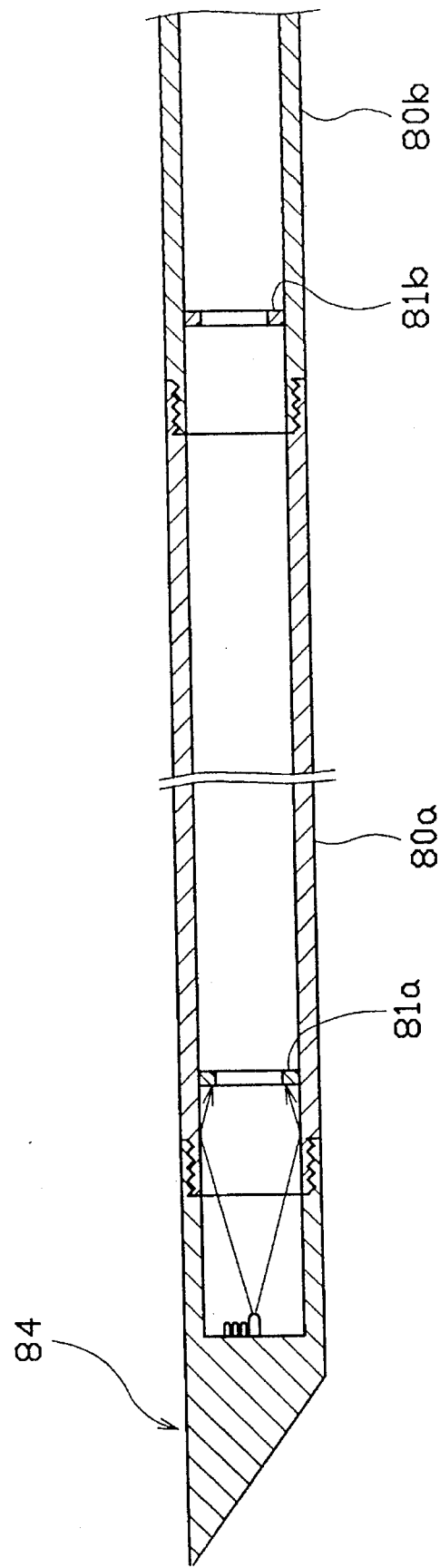
FIG. 6 is a vertical sectional view depicting the manner of operation of the FIG. 4 lead pipe.
Figure 7:
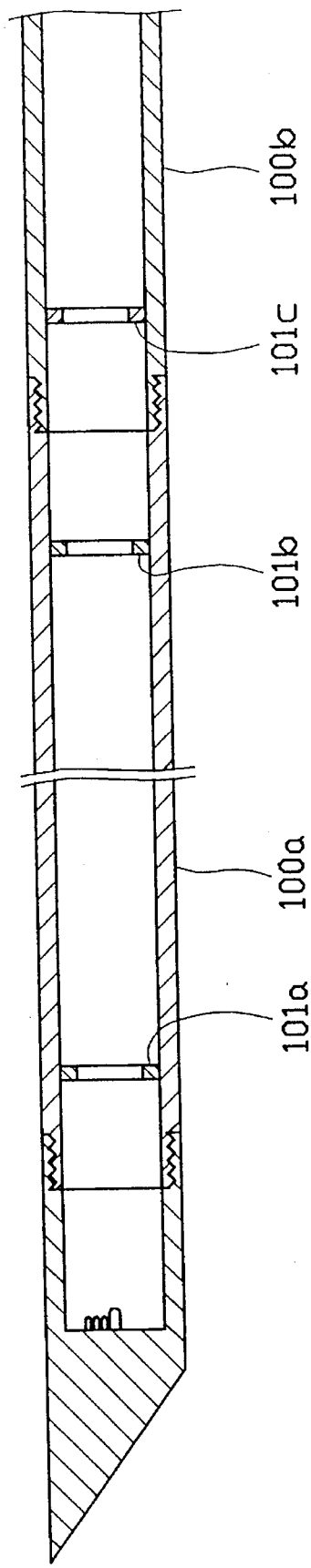
FIG. 7 is a vertical sectional view showing a form of lead pipe wherein light shield rings are disposed within the lead pipe at the opposite fore and rear ends thereof.

Referring to FIGS. 6 and 7, the following is a description of a still further embodiment of the invention. This represents a slight modification of an earlier described which simplifies lead pipe production. Referring to FIG. 6, identical light shields 81*a*, 81*b*, . . . are arranged within lead pipes 80*a*, 80*b*, . . . If direction correcting head 84 is positioned relatively close to only several lead pipes, irregular reflections within lead pipes 80*a*, 80*b*, . . . would not be a problem, and there would be fewer light shields 81*a*, 81*b*, . . . However, if many lead pipes 80*a*, 80*b*, . . . are connected, and direction connecting head 84 is positioned far away, then there would be more light shields 81*a*, 81*b*, . . . , thus allowing the resulting reflected light to be blocked.

Referring to FIG. 7, there is shown light shields 101*a*, 101*b*, 101*c*, . . . arranged near both ends of lead pipes 100*a*, 100*b*, . . . respectively. When many lead pipes 100*a*, 100*b*, . . . are connected, a greater number of light shields 101*a*, 101*b*, 101*c*, . . . would be present, and this would increase the rate of reflected light that is blocked.

Figure 8:
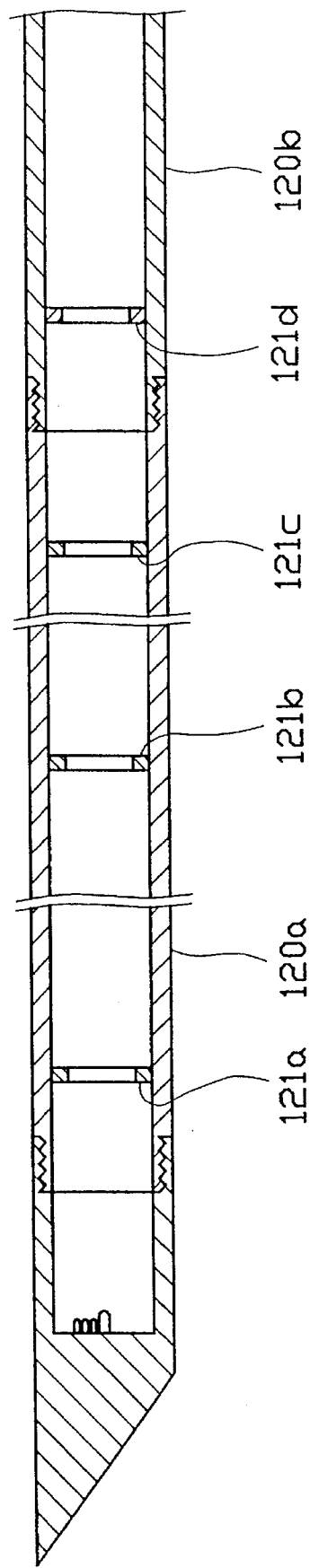
FIG. 8 is a vertical sectional view showing a form of lead pipe wherein plural light shield rings are disposed within the lead pipe.

Referring to FIG. 8, a plurality of light shields 121*a*, 121*b*, 121*c*, 121*d*, . . . are arranged at appropriate positions of lead pipes 120*a*, 120*b*, . . . respectively, thus further improving the blockage of reflected light.

Figure 9:
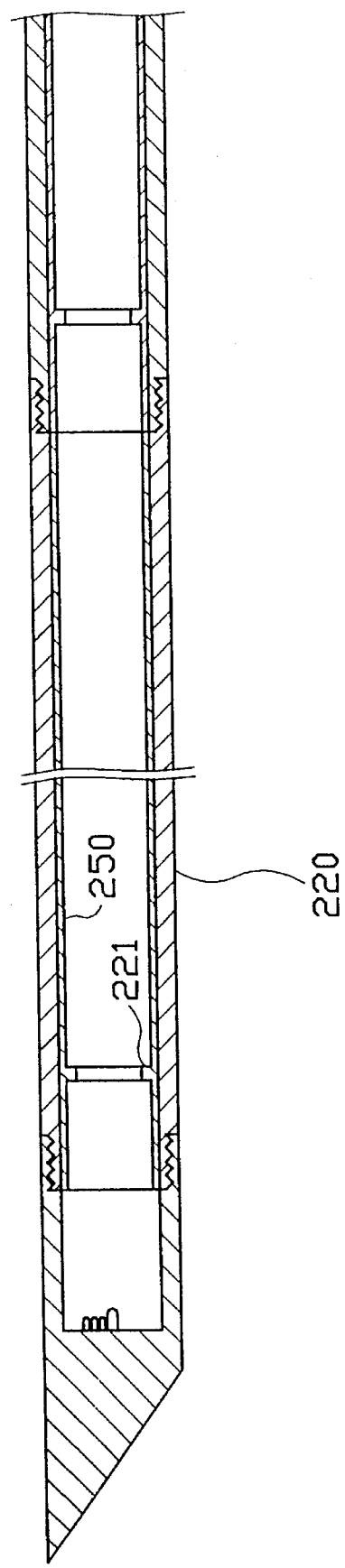
FIG. 9 is a vertical sectional view showing a form of lead pipe in which light shield rings are formed in a tubular insert receivable in the bore of the lead pipe.

Another embodiment of the present invention is seen with reference to FIG. 9. In this embodiment, a light absorber made as a cylindrical tube 250 having an outer diameter that can fit in lead pipe 220 and a ring-shaped light shield 221 are formed integrally. Light absorber 250 is inserted into the hollow part of lead pipe 220, and lead pipe 220 is connected while in this state. Lead pipe 220 requires a certain amount of external strength to withstand resistance from soil pressure as well as resistance from friction with silt during propulsion. However, there are no strength requirements internally, so the inside can be made from relatively weak material. Also, because light absorber 250 is independent from lead pipe 220, it can be separated from lead pipe 220 during storage. This prevents adhesion of rust-preventing oils, and keeps light from reflecting after a period of storage.

For example instead of using a highly light-absorbent resin, it would be possible to use a black paint sold generally.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A lead pipe configuration for use in an underground piping device of a type which lays down an underground pipeline, wherein the piping device includes propelling means for propelling the lead pipe configuration in a forward direction to guide the pipeline lay down, the lead pipe configuration comprising a plurality of hollow lead pipes connected in endwise succession of one lead pipe with another, a direction correcting head carried at a fore end of a frontmost lead pipe in the succession, a light source carried in said direction correcting head for projecting light rearwardly in the lead pipe succession toward a light detection means so that a detected light can be used to determine if any error in lead pipe direction from the said predetermined direction exists requiring that lead pipe direction adjustment be made, and a ring-shaped light shield carried in at least one of the lead pipes in said succession and disposed crosswise to a lead pipe major axis so as to block passage of at least some of any rearwardly non axially directed incident light as well as light reflecting off inner surfaces of the said one lead pipe upstream of the light shield.

2. A lead pipe configuration as set forth in claim 1 further comprising a high light absorption coating carried on the inner surfaces of said lead pipes for absorbing at least some of any rearwardly non axially directed incident light as well light reflecting thereagainst.

3. A lead pipe configuration as set forth in claim 2 in which the high light absorption coating is of a resin.

4. A lead pipe configuration as set forth in claim 1 in which the ring-shaped light shield is carried at a fore end location in said one lead pipe.

5. A lead pipe configuration as set forth in claim 1 in which a ring-shaped light shield is carried in each of said lead pipes.

6. A lead pipe configuration as set forth in claim 1 further comprising a tubular sleeve received in said one lead pipe, said ring-shaped light shield being carried in said sleeve.

7. A lead pipe configuration as set forth in claim 6 in which the tubular sleeve is made of a high light absorption material.

8. A lead pipe configuration as set forth in claim 7 in which the ring-shaped light shield is made integral with the tubular sleeve.

9. A lead pipe configuration as set forth in claim 8 in which the tubular sleeve and ring-shaped light shield are made of a resin.

10. A lead pipe configuration as set forth in claim 1 in which plural ring-shaped light shields are carried in each of said lead pipes.

11. A lead pipe configuration as set forth in claim 10 in which the plural ring-shaped light shields carried in each lead pipe are located proximal a fore end of the lead pipe.

12. A lead pipe configuration as set for in claim 10 in which the plural ring-shaped light shields carried in each lead pipe are disposed at spaced apart locations between a fore end and a rear end of the lead pipe.

\* \* \* \* \*